United States Patent
Chen et al.

(10) Patent No.: US 9,979,422 B1
(45) Date of Patent: May 22, 2018

(54) ADAPTIVE DIGITAL PRE-DISTORTION SYSTEM

(71) Applicant: NATIONAL CHUNG SHAN INSTITUTE OF SCIENCE AND TECHNOLOGY, Taoyuan (TW)

(72) Inventors: Yih-Min Chen, Taoyuan (TW); Chin-Kun Lin, Hsinchu (TW); Ting-Yu Lai, Taoyuan (TW); Cheih Tu, New Taipei (TW); Chen-Chia Ku, Taoyuan (TW); Chien-Te Yu, Taoyuan (TW)

(73) Assignee: NATIONAL CHUNG SHAN INSTITUTE OF SCIENCE AND TECHNOLOGY, Taoyuan (TW)

(*) Notice: Subject to any disclaimer, the term of this patent is extended or adjusted under 35 U.S.C. 154(b) by 0 days. days.

(21) Appl. No.: 15/380,757

(22) Filed: Dec. 15, 2016

(51) Int. Cl.
*H04K 1/02* (2006.01)
*H04B 1/04* (2006.01)
*H04B 1/10* (2006.01)
*H04B 17/11* (2015.01)

(52) U.S. Cl.
CPC .............. *H04B 1/0475* (2013.01); *H04B 1/10* (2013.01); *H04B 17/11* (2015.01)

(58) Field of Classification Search
CPC ......... H04B 1/0475; H04B 17/11; H04B 1/10
USPC ...................................... 375/296
See application file for complete search history.

(56) References Cited

U.S. PATENT DOCUMENTS

| | | | | |
|---|---|---|---|---|
| 5,900,778 A * | 5/1999 | Stonick | ............... | H03F 1/3247 330/149 |
| 7,136,628 B2 * | 11/2006 | Yang | ............... | H03F 1/3247 330/149 |
| 2003/0076894 A1 * | 4/2003 | Jin | ............... | H03F 1/3241 375/296 |
| 2003/0184372 A1 * | 10/2003 | Fudaba | ............... | H03F 1/3241 330/149 |
| 2005/0123066 A1 * | 6/2005 | Sarca | ............... | H03F 1/3247 375/296 |
| 2013/0315291 A1 * | 11/2013 | Kim | ............... | H03F 1/3247 375/232 |
| 2015/0194936 A1 * | 7/2015 | Inanoglu | ............... | H03F 1/0222 330/291 |

* cited by examiner

*Primary Examiner* — Helene Tayong
(74) *Attorney, Agent, or Firm* — WPAT, PC (57) ABSTRACT

An adaptive digital pre-distortion system includes a transmitting module and a receiving module. The transmitting module is configured to receive a first signal and includes a modulator, pre-distortion module, and transmitting circuit. The pre-distortion module is coupled to the modulator to perform a pre-distortion operation in accordance with the first modulation signal and generate a first pre-distortion signal. The transmitting circuit generates a first transmitted signal in accordance with the first pre-distortion signal. The receiving module is configured to receive the first transmitted signal and includes a receiving circuit, demodulator, and prediction module. The prediction module generates a pre-distortion parameter in accordance with a modulation vector error between the second demodulation signal and the first signal and transmits the pre-distortion parameter to the pre-distortion module, wherein the pre-distortion module adjusts the pre-distortion operation of the pre-distortion module in accordance with the pre-distortion parameter.

5 Claims, 5 Drawing Sheets

ADAPTIVE DIGITAL PRE-DISTORTION SYSTEM

FIELD OF THE INVENTION

The present invention relates to pre-distortion systems and, more particularly, to an adaptive digital pre-distortion system.

BACKGROUND OF THE INVENTION

Figure 1:
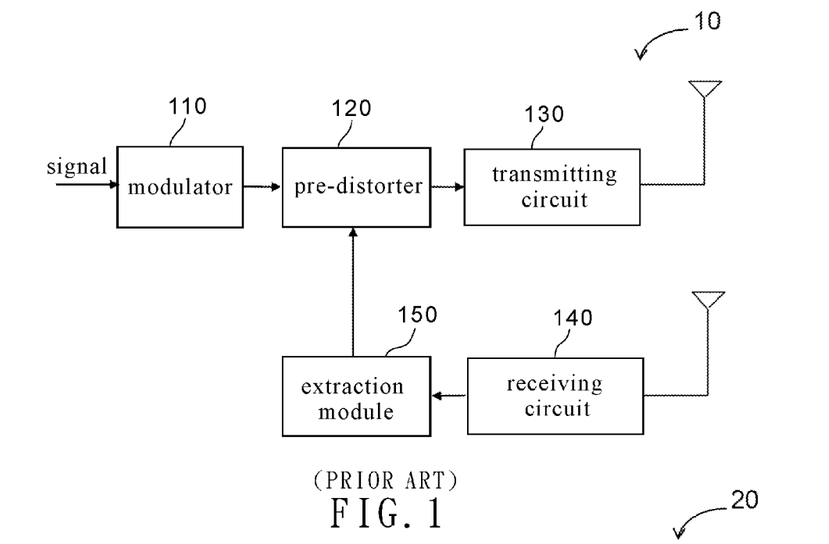
FIG. 1 (PRIOR ART) is a block diagram of a conventional pre-distortion system.

Although a radio frequency signal power amplifier is crucial to a radio frequency communication transmitter, its non-linear characteristics cause distortion to radio frequency signals. In view of this, it is important to optimize its non-linear characteristics. Referring to FIG. 1, an adaptive digital pre-distortion (DPD) framework comprises a modulator (MOD) 110, a pre-distorter 120, a transmitting circuit 130, a receiving circuit 140, and an extraction module 150. The prior art discloses that the pre-distorter 120 operates in conjunction with a monitoring receiver, so as for the extraction module 150 to perform signal model parameter extraction by signal waveform distortion standards, and then the pre-distorter 120 adjusts its input/output response relationship in accordance with the extracted parameter, thereby correcting the distortion.

A typical memory polynomial model and its related parameter extraction equation are shown below.

$$\hat{r}_B[n] = DPD\{\vec{r}_B\} = \qquad (1)$$

$$\sum_{q=0}^{Q}\sum_{l=1}^{L} a_{q,l} \cdot r_B[n-q] \cdot |r_B[n-q]|^{l-1} \approx \hat{s}_B[n] \Rightarrow \min_{\vec{A}} \left| R \cdot \vec{A} - \hat{\vec{s}}_B \right|^2$$

$$\vec{A} = [a_{q,l} \mid q = 0 \sim Q, l = 1 \sim L]$$

$$R = [r_B[n-q] \cdot |r_B[n-q]|^{l-1} \mid q = 0 \sim Q, l = 1 \sim L,$$

$$n = 0 \sim N - 1]$$

$$\therefore \vec{A}_{SD,opt} = (R^H \cdot R)^{-1} \cdot R^H \cdot \hat{\vec{s}}_B$$

As indicated by equation (1), not only does parameter extraction require intricate matrix-based computation, but linear channel distortion in the transmitting module is also included in the digital pre-distortion framework. As a result, even if the non-linear amplifier approximates to a memoryless non-linear model, the memory polynomial model is not going to disappear, and thus overall structural complexity remains unabated.

Furthermore, conventional pre-distortion technology usually involves optimizing the polynomial coefficients by the full-range input/output relationship of a digital pre-distorter, but doing so inevitably increases the complexity of a pre-distortion system, consumes much computation resources, and renders pre-distortion processing inefficient. Accordingly, pre-distortion technology still has room for improvement in terms of the reduction in the complexity of pre-distortion processing.

SUMMARY OF THE INVENTION

It is an objective of the present invention to provide an adaptive digital pre-distortion system which requires simple computation resources and enhances the efficiency of adaptive pre-distortion operation.

In order to achieve the above and other objectives, the present invention provides an adaptive digital pre-distortion system which comprises a transmitting module and a receiving module. The transmitting module is configured to receive and transmit a first signal (QAM symbol) and includes a modulator (symbol-to-waveform), pre-distortion module, and transmitting circuit. The pre-distortion module is coupled to the modulator to perform a pre-distortion operation in accordance with the first modulation signal and generate a first pre-distortion signal. The transmitting circuit generates a first transmitted signal in accordance with the first pre-distortion signal. The transmitting circuit comprises a digital-to-analog converter (DAC), a radio frequency (RF) up-converter, and a radio frequency power amplifier. The receiving module is configured to receive the first transmitted signal and includes a receiving circuit, demodulator (waveform-to-symbol), and prediction module. The receiving circuit comprises a low-noise amplifier (LNA), a radio frequency (RF) down-converter, and an analog-to-digital converter (ADC). The prediction module generates a pre-distortion parameter in accordance with a modulation vector error between the first demodulation signal (received QAM symbol) and the first signal (transmitted QAM symbol) and transmits the pre-distortion parameter to the pre-distortion module, wherein the pre-distortion module adjusts the pre-distortion operation of the pre-distortion module in accordance with the pre-distortion parameter.

In an embodiment of the present invention, the prediction module updates the pre-distortion parameter in accordance with a variation in the modulation vector error between the first demodulation signal and the first signal as time goes by and updates the pre-distortion parameter in accordance with a first mode in case of a reduction in the modulation vector error, and the prediction module updates the pre-distortion parameter in accordance with a second mode if the modulation vector error varies rather than reduces.

In an embodiment of the present invention, the pre-distortion module adjusts coefficients of a polynomial in a pre-distortion response of the pre-distortion module in accordance with the pre-distortion parameter.

In an embodiment of the present invention, the pre-distortion module generates, in a first section of the pre-distortion operation, the first pre-distortion signal in linear relation to the first modulation signal in accordance with the first modulation signal, and the pre-distortion module generates, in a second section of the pre-distortion operation, the first pre-distortion signal in non-linear relation to the first modulation signal in accordance with the first modulation signal.

In an embodiment of the present invention, the non-linear relation is a polynomial relation.

Accordingly, the present invention provides an adaptive digital pre-distortion system which requires simple computation resources and enhances the efficiency of adaptive pre-distortion operation. The pre-distortion operation is adjusted with reference to the modulation vector error rather than conventional signal waveform distortion and thereby greatly reduces the complexity of the required computation resources, thereby simplifying the required hardware or software.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

The present invention provides an adaptive digital pre-distortion system which requires simple computation resources and enhances the efficiency of adaptive pre-distortion operation. The pre-distortion operation is adjusted with reference to the modulation vector error rather than conventional signal waveform distortion and thereby greatly reduces the complexity of the required computation resources, thereby simplifying the required hardware or software. In an embodiment of the present invention, the pre-distortion operation is constructed with a two-section polynomial response model to further simplify the computation resources required for pre-distortion. Hence, the adaptive digital pre-distortion system of the present invention is conducive to the implementation of a communication system and effective in enhancing overall communication efficiency.

Figure 2:
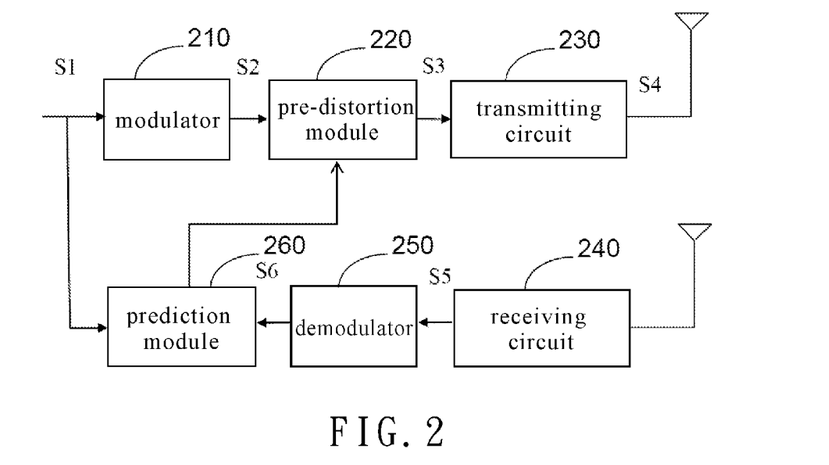
FIG. 2 is a block diagram of an adaptive digital pre-distortion system according to an embodiment of the present invention.

FIG. 2 is a block diagram of an adaptive digital pre-distortion system according to an embodiment of the present invention. This embodiment provides an adaptive digital pre-distortion system for adjusting pre-distortion in accordance with a modulation vector error. Referring to FIG. 2, in this embodiment, the adaptive digital pre-distortion system 20 comprises an transmitting module and a receiving module which include a pre-distortion module 220 and a prediction module 260, respectively, to perform pre-distortion. The prediction module 260 determines, according to the modulation vector error, the way of adjusting the pre-distortion operation of the pre-distortion module 220, so as to reduce the overall complexity of the pre-distortion operation.

Referring to FIG. 2, the transmitting module is configured to receive and transmit a first signal S1 and comprises a modulator 210, a pre-distortion module 220, and a transmitting circuit 230. The modulator 210 modulates the first signal S1 and generates a first modulation signal S2. The pre-distortion module 220 is coupled to the modulator 210 to perform a pre-distortion operation in accordance with the first modulation signal S2 and generate a first pre-distortion signal S3. The transmitting circuit 230 is coupled to the pre-distortion module 220 to receive the first pre-distortion signal S3 and generate a first transmitted signal S4. For instance, the first transmitted signal S4 is transmitted through at least an antenna unit. In the transmitting circuit 230, the first pre-distortion signal S3 generates the first transmitted signal S4 through at least a non-linear radio frequency component, such as a power amplifier; hence, the first transmitted signal S4 compensates for signal distortion of the at least a non-linear radio frequency component, such as a power amplifier.

Referring to FIG. 2, the receiving module is configured to receive the first transmitted signal S4 and comprises a receiving circuit 240, a demodulator 250, and a prediction module 260. The receiving circuit 240 receives the first transmitted signal S4 and generates a first received signal S5. The demodulator 250 is coupled to the receiving circuit 240 to demodulate the first received signal S5 and generate a first demodulation signal S6. The prediction module 260 is coupled to the demodulator 250 and the pre-distortion module 220 to generate a pre-distortion parameter in accordance with the modulation vector error between the first demodulation signal S6 and the first signal S1 and transmit the pre-distortion parameter to the pre-distortion module 220.

The receiving module of the adaptive digital pre-distortion system 20 also functions as a monitoring receiver and performs a signal sampling process on the first transmitted signal S4 to facilitate subsequent processes. Hence, for example, the receiving circuit 240 of the receiving module is provided in the form of at least an antenna unit for receiving the first transmitted signal S4. In another example, the receiving circuit 240 captures the transmitting signal S4 (i.e., performs a signal sampling process) from the output end of the transmitting circuit 230 through a radio frequency coupler (RF coupler), but the present invention is not limited thereto.

Referring to FIG. 2, in an embodiment of the adaptive digital pre-distortion system 20, pre-distortion is adjusted according to the modulation vector error in various ways. In an embodiment of the present invention, the prediction module 260 works in the ways described below. The prediction module 260 updates the pre-distortion parameter in accordance with a variation in the modulation vector error between the first demodulation signal S6 and the first signal S1 as time goes by and updates the pre-distortion parameter in accordance with a first mode in case of a reduction in the modulation vector error, and updates the pre-distortion parameter in accordance with a first mode in case of a reduction in the modulation vector error. For example, the first mode entails generating a pre-distortion parameter for use with the update to fine-tune the pre-distortion response of the pre-distortion module 220. The prediction module 260 updates the pre-distortion parameter in accordance with a second mode if the modulation vector error varies rather than reduces. For example, the second mode entails generating a pre-distortion parameter for use with the update to fine-tune the pre-distortion response of the pre-distortion module 220 reversely. The beginning and the ending of the update of the pre-distortion parameter can be defined with a threshold or by updating the pre-distortion parameter repeatedly, so as to adjust the pre-distortion in accordance with the modulation vector error.

Referring to FIG. 2, in an embodiment of the adaptive digital pre-distortion system 20, the pre-distortion operation of the pre-distortion module 220 is effectuated in various ways in conjunction with the prediction module 260 to achieve adaptive pre-distortion. For instance, the pre-distortion operation of the pre-distortion module 220 is effectuated in accordance with a piecewise function, for example, in accordance with a piecewise polynomial, to obtain a pre-distortion response of the pre-distortion module 220. The pre-distortion parameter generated by the prediction module 260 is for use in adjusting the pre-distortion response.

In an embodiment of the present invention, to improve the non-linear characteristics of a non-linear radio frequency component, such as a radio frequency power amplifier, the pre-distortion operation of the pre-distortion module 220 entails obtaining a pre-distortion signal in accordance with a two-section function, wherein the two sections are known as a first section and a second section and correspond to a linear region and a non-linear region, respectively. In the first section where the pre-distortion operation takes place, the pre-distortion module 220 generates the first pre-distortion signal in linear relation to the first modulation signal in accordance with the first modulation signal. In the second section where the pre-distortion operation takes place, the pre-distortion module 220 generates the first pre-distortion signal in non-linear relation to the first modulation signal in accordance with the first modulation signal. Therefore, when the first modulation signal is in the first section, the pre-distortion module 220 generates the first pre-distortion signal in accordance with a linear relation. The pre-distortion module 220 requires less computation resources when operating in the first section than in the second section. Unlike the prior art that discloses a conventional pre-distorter for generating a pre-distortion signal with the same polynomial regardless of the characteristics of an input signal, this embodiment of the present invention is characterized in that not only is the pre-distortion operation of the pre-distortion module 220 effectuated by a piecewise function, but pre-distortion is also adjusted by the prediction module 260 in accordance with a modulation vector error. On the whole, this embodiment further simplifies computation resources required for pre-distortion, is conducive to the implementation of a communication system, and enhances overall communication efficiency.

For instance, the pre-distortion module 220 and the prediction module 260 are implemented by hardware and/or software, including any circuit module, such as a microprocessor, a digital signal processor, a microcontroller, a field programmable gate array (FPGA), an application specific integrated circuit (ASIC), or a combination thereof. The pre-distortion module 220 and the prediction module 260 are provided in the form of two aforesaid circuit modules. Alternatively, the pre-distortion module 220 and the prediction module 260 are combined and integrated into any aforesaid circuit module, but the present invention is not limited thereto. In a variant embodiment, at least one of the pre-distortion module 220 and the prediction module 260 is provided in the form of a dedicated circuit module.

The receiving module and the transmitting module are described below. In an embodiment of the adaptive digital pre-distortion system, the pre-distortion module 220 of the transmitting module changes, with an initial digital pre-distortion function $f_{DPD}^{(0)}\{x\}$, a baseband signal (which can be computed by hardware or software) to be transmitted. The transmitting circuit 230 comprises a digital-to-analog converter (DAC), a radio frequency (RF) up-converter, and a radio frequency power amplifier. The pre-distortion module 220 generates the first pre-distortion signal S3 which is then converted into a radio frequency signal by the DAC and the RF up-converter, amplified by a radio frequency (non-linear) amplifier, and eventually transmitted by an antenna.

The first transmitted signal S4 transmitted by the transmitting circuit 230 is converted into a digital baseband signal through a receiving circuit 240 of a receiving module which functions as a monitoring receiver. The receiving circuit 240 comprises a low-noise amplifier (LNA), a radio frequency (RF) down-converter, and an analog-to-digital converter (ADC), but the present invention is not limited thereto. The digital baseband signal generated from the receiving circuit 240 undergoes signal demodulation performed by the demodulator the demodulator 250, and then the demodulated digital baseband signal is calculated with the prediction module 260 to observe the modulation vector error between its received signal code and the original transmitting signal code and thereby generate a pre-distortion parameter whereby the digital pre-distortion function $f_{DPD}^{(0)}\{x\}$ is fine-tuned in a first mode. Afterward, as time goes by, the prediction module 260 observes the variations in the modulation vector error and fine-tunes the digital pre-distortion function in the first mode if it detects a reduction in the modulation vector error, otherwise it will fine-tune the digital pre-distortion function in a second mode (which is the opposite of the first mode, for example), thereby performing adjustments and effectuating adaptive digital pre-distortion in accordance with a modulation vector error.

For instance, the modulator 210 is a module for converting a signal code (such as quadrature amplitude modulation (QAM) symbol) to be transmitted into a signal waveform, and is exemplified by orthogonal frequency-division multiplexing (OFDM), as shown below.

$$s_B[n] = \sum_k S_l[k] \cdot e^{j\frac{2\pi}{N} \cdot k \cdot n}, n = 0 \sim N-1$$

$s_B[n]$: singal waveform; $S_l[k]$: QAM symbol

The pre-distortion module 220 performs pre-distortion on a signal waveform to offset non-linear characteristics of a non-linear amplifier and thereby simulates linear ideal amplifier characteristics so that the non-linear amplifier undergoes digital pre-distortion to function as a linear amplifier, as expressed by equations below.

$$DPD: \hat{s}_B[n] = DPD\{s_B[n]\} = f_{DPD}\{|s_B[n]|\} \cdot e^{j \angle s_B[n]}$$

$$DAC + QM + NPA: \hat{s}_B[n] \to \hat{s}_B(t) = f_{DPD}\{|s_B(t)|\} \cdot e^{j \angle s_B[t]}$$

$$x_{RF}(t) = \text{Re}\{f_{NPA}\{|\hat{s}_B(t)|\} \cdot e^{j \angle \hat{s}_B(t)} \cdot e^{j2\pi \cdot f_C t}\} \approx \text{Re}\{s_B(t) \cdot e^{j2\pi \cdot f_C t}\}$$

$$\because f_{NPA}\{|\hat{s}_B(t)|\} = f_{NPA}\{f_{DPD}\{|s_B(t)|\}\} \approx |s_B(t)|$$

$f_{DPD}\{x\}$: pre-distortion function $f_{NPA}\{x\}$: non-linear amplifier characteristic For instance, the demodulator 250 is a module for retrieving the signal code (QAM symbol) from the received signal waveform, and is exemplified by orthogonal frequency-division multiplexing (OFDM), as expressed by equations below.

$$\hat{r}_B[n] = \hat{s}_B[n] * h_B[n], *: \text{convolution}$$

$$\tilde{R}_l[k] = \sum_n \hat{r}_B[n] \cdot e^{-j\frac{2\pi}{N} \cdot k \cdot n} \approx S_l[k] \cdot H_B[k]$$

$$\hat{R}_l[k] = \tilde{R}_l[k] / H_B[k] \approx S_l[k]$$

For instance, the prediction module 260 calculates error vector measurement (EVM) of a modulation vector error, which is defined as follows:

$$EVM = E\{|\hat{R}_l[k] - S_l[k]|^2\},$$

$E\{\ \}$ calculating the average

For instance, the adaptive digital pre-distortion system is digitalized, as expressed by equations below.

$$\vec{s}_B = MOD\{\vec{S}_l\} \quad (2)$$

$$\vec{S}_l = [S_l[k] \mid k = 1 \sim K]^T, S_l[k] \in QAM$$

$$\vec{r}_B = NL\{DPD\{\vec{s}_B\}\} * \vec{h}_B$$

$$\hat{\vec{R}}_l = [\hat{R}_l[k] \mid k = 1 \sim K] =$$

$$DEMOD\{\vec{r}_B\} = DEMOD_{EQ}\{NL\{DPD\{\vec{s}_B\}\}\}$$

$$\therefore DPD_{EVM,opt} = \arg\min_{DPD} E\{|\hat{R}_l - \vec{S}_l|^2\} =$$

$$\min_{DPD} E\{|DEMOD_{EQ}\{NL\{DPD\{\vec{s}_B\}\}\} - \vec{S}_l|^2\}$$

wherein $DEMOD_{EQ}\{\ \}$ denotes a demodulate function of equalization of linear channel distortion. As shown by equation (2), when the non-linear radio frequency power amplifier has a characteristic of being memoryless, its non-linear characteristic is simply AM-AM non-linear, wherein $DPD\{\ \}$ denotes its linearization function.

Both the modulator and the demodulator are implemented by hardware and/or software, including any circuit module, such as a microprocessor, a digital signal processor, a microcontroller, a field programmable gate array (FPGA), an application specific integrated circuit (ASIC), or a combination thereof. All the modules and components attributed to the transmitting module and the receiving module and configured for use in digital processing can be provided in the form of, or integrated into, the aforesaid digital circuit modules, but the present invention is not limited thereto. In a variant embodiment, the modules and components attributed to the transmitting module and the receiving module and configured for use in digital processing can be provided in the form of dedicated circuit modules.

Figure 3A:
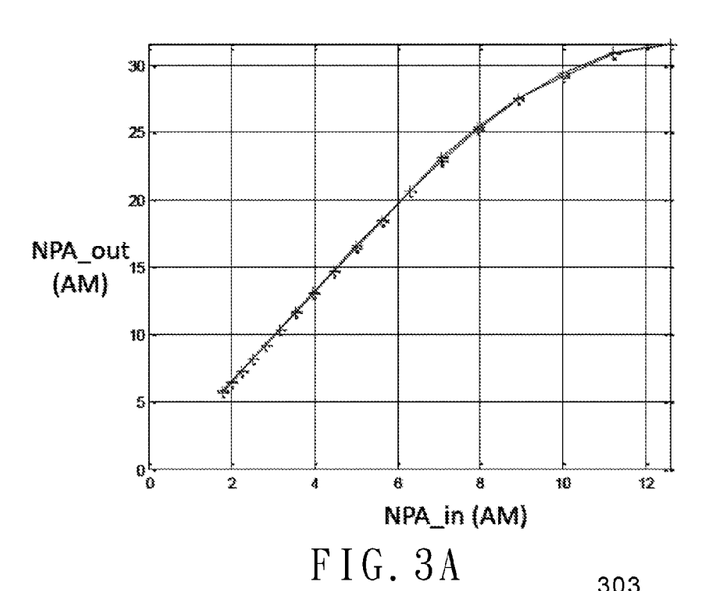
FIG. 3A~FIG. 3B are graphs of pre-distortion characteristics of the adaptive digital pre-distortion system according to an embodiment of the present invention.
Figure 3B:
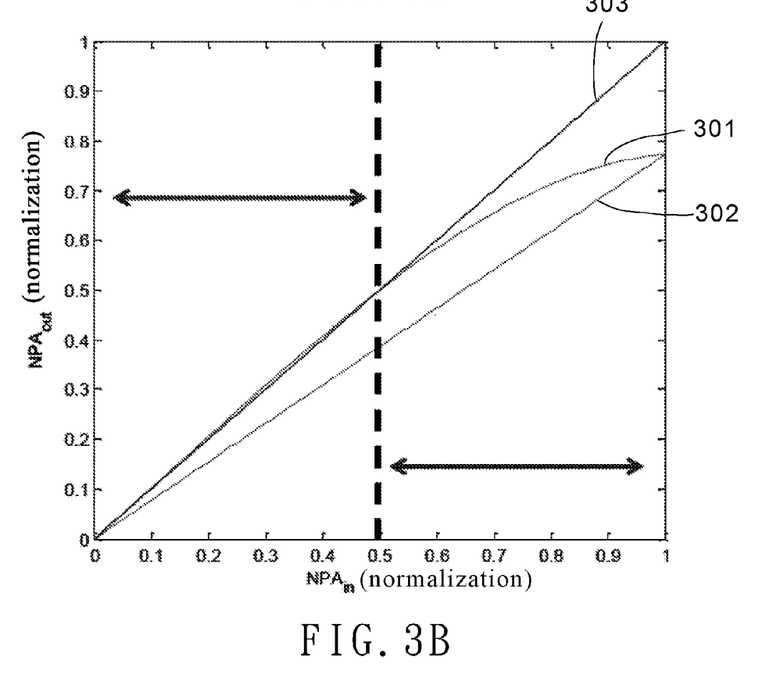

In an embodiment, the pre-distortion operation performed by the pre-distortion module 220 of the adaptive digital pre-distortion system 20 shown in FIG. 2 entails obtaining a pre-distortion signal in accordance with a two-section function, wherein the two sections are known as a first section and a second section and correspond to a linear region and a non-linear region, respectively. In the first section where the pre-distortion operation takes place, the pre-distortion module 220 generates the first pre-distortion signal in accordance with the first modulation signal and a linear relation. In the second section where the pre-distortion operation takes place, the pre-distortion module 220 generates the first pre-distortion signal in accordance with the first modulation signal and a polynomial relation. FIG. 3A and FIG. 3B are graphs of pre-distortion characteristics of the adaptive digital pre-distortion system according to an embodiment of the present invention. FIG. 3A shows typical AM-AM characteristics of a non-linear radio frequency power amplifier, wherein characteristics outside its saturated region are divided into a linear region of a low signal level and a non-linear region near the saturated region. In this embodiment, the pre-distortion operation performed by the pre-distortion module 220 of the adaptive digital pre-distortion system 20 shown in FIG. 2 entails obtaining a pre-distortion signal in accordance with a two-section function, wherein the two sections are known as a first section and a second section and correspond to a linear region and a non-linear region, respectively. In the first section where the pre-distortion operation takes place, the pre-distortion module 220 generates the first pre-distortion signal in linear relation to the first modulation signal in accordance with the first modulation signal. In the second section where the pre-distortion operation takes place, the pre-distortion module 220 generates the first pre-distortion signal in non-linear relation to the first modulation signal in accordance with the first modulation signal. Assuming that both the input boundary value of the linear region and the input/output boundary values of saturated region are known parameters, normalization of non-linear PA characteristics (i.e., dividing the input by the input boundary value of the saturated region, and normalizing the input/output gain to become 1) brings equations as follows:

$$y = NL\{x\} = \begin{cases} x, & x \leq I_L \\ g(x), & I_L < x \leq 1 \end{cases}, y_{max} = g(1) \quad (3)$$

$$x = DPD_{\vec{a}}\{s\} = \begin{cases} y_{max} \cdot s, & s \leq I_L \\ dpd_{\vec{a}}(s), & I_L < s \leq 1 \end{cases}, \vec{a} = [a_p \mid p = 2 \sim P]$$

$$dpd_{\vec{a}}(s) = y_{max} \cdot I_L + y_{max} \cdot (s - I_L) + \sum_{p=2}^{P} a_p \cdot (s - I_L)^2 \ \& \ dpd_{\vec{a}}(1) =$$

$$1 \Rightarrow \min_{\vec{a}} E\{|DEMOD_{EQ}\{NL\{DPD_{\vec{a}}\{\vec{s}_B\}\}\} - \vec{S}_l|^2\}$$

FIG. 3A is a schematic view of a characteristic curve outside the saturated region of a digital pre-distortion framework, the horizontal axis represents non-linear amplifier input (NPA_in) AM characteristics, and the vertical axis represents non-linear amplifier output (NPA_out) AM characteristics. Referring to FIG. 3B, the digital pre-distortion framework has its characteristics normalized and further divided into a linear region of a low signal level and a non-linear region near the saturated region. FIG. 3B shows that curve 301 is attributed to a non-linear power amplifier, curve 302 to a non-linear power amplifier of an ideal pre-distortion framework, and curve 303 to an ideal linear power amplifier. The gain in the linear region of curve 302 is suppressed.

When non-linear characteristics of a non-linear radio frequency power amplifier approximate to a memoryless AM-AM non-linear model, intricate computation of matrices and vectors can be reduced by reducing a modulation vector error as disclosed in this embodiment of the present invention. Referring to equation (3), the two-section pre-distortion framework in this embodiment effectuates optimization of parameters of polynomial response pre-distortion operation, for example, by conducting an online repetitive parameter search for pre-distortion operation optimized parameters, as exemplified by pseudo codes and equations shown in Table 1 below.

TABLE 1 initial: i=0, $\vec{a}^{(i)} = [a_p^{(0)} | p = 2 \sim P]$, $EVM_i = E\{|DEMOD_{EQ}\{NL\{DPD_{\vec{a}^{(i)}}\{\vec{s}_l\}\}\} - \vec{S}_l|^2\}$
(S10) i = i + 1
(S20) $EVM_i = E\{|DEMOD_{EQ}\{NL\{DPD_{\vec{a}^{(i)}}\{\vec{s}_l\}\}\} - \vec{S}_l|^2\}$ TABLE 1-continued (S30) $EVM_i < EVM_{i-1}$ then $\vec{a}^{(i)} = \vec{a}^{(i-1)} + \Delta \vec{a}^{(i)}$, goto(S10)
(S40) if $EVM_i >= EVM_{i-1}$ then
$\vec{a}^{(i)} = \vec{a}^{(i-1)} - \Delta \vec{a}^{(i)}$, $EVM_i = EVM_{i-1} - (EVM_i - EVM_{i-1})$, goto (S10)

In the embodiment exemplified by pseudo codes shown in Table 1, the prediction module 260 calculates a modulation vector error between the first signal and the first demodulation signal as time goes by (as disclosed in the initial step and step S20) and updates the pre-distortion parameter in accordance with a variation in the modulation vector error (as disclosed in steps S30, S40). In case of a reduction in the modulation vector error, the prediction module 260 will update the pre-distortion parameter in accordance with a first mode (as disclosed in step S30), for example, when the first mode entails generating an update-related pre-distortion parameter, so as to fine-tune coefficients (such as $\vec{a}$ which includes $a_p$, wherein p=2~P) of the polynomial in the pre-distortion response of the pre-distortion module 220. If the modulation vector error does not reduce, the prediction module 260 will update the pre-distortion parameter in accordance with a second mode (step S40), for example, when the second mode entails generating an update-related pre-distortion parameter, so as to reversely fine-tune coefficients of the polynomial in the pre-distortion response of the pre-distortion module 220 (step S30). Therefore, the beginning and the ending of the update of the pre-distortion parameter can be defined with a threshold or by updating the pre-distortion parameter repeatedly, so as to adjust the pre-distortion in accordance with the modulation vector error. However, the present invention is not limited to the above embodiments, but may involve determining coefficients of the polynomial in the pre-distortion response or in adjustment of the pre-distortion operation proportionally or any other means.

Since the non-linear characteristics of a non-linear radio frequency power amplifier vary slowly relative to communication signal EVM measurement frequency, the aforesaid simple repetitive parameter search is effective in adaptively tracking variations in its non-linear characteristics, so as to maintain the effect of EVM on relatively optimized adaptive digital pre-distortion.

When the non-linear characteristics of a non-linear radio frequency power amplifier approximate to a memoryless AM-AM non-linear model without any prediction error between the model and the parameter, the present invention can also correct the non-linear characteristics of the radio frequency power amplifier, as expressed by equations below.

$$DPD_{SD,opt} = \underset{DPD}{\arg\min} E\left\{\left|DPD\{\vec{r}_B\} - \vec{s}_B\right|^2\right\} \Rightarrow DPD_{SD,opt} = NL_{ch}^{-1}$$

$$\therefore \vec{r}_B = NL_{ch}\{DPD_{SD,opt}\{\vec{s}_B\}\} = NL_{ch}\{NL_{ch}^{-1}\{\vec{s}_B\}\} = \vec{s}_B$$

$$DPD_{EVM,opt} = \underset{DPD}{\arg\min} E\left\{\left|\vec{R}_l - \vec{S}_l\right|^2\right\} =$$

$$\underset{DPD}{\min} E\left\{\left|DEMOD_{EQ}\{NL\{DPD\{\vec{s}_B\}\}\} - \vec{S}_l\right|^2\right\} \Rightarrow DPD_{EVM,opt} = NL^{-1}$$

$$\therefore \vec{R}_l = DEMOD_{EQ}\{NL\{DPD_{EVM,opt}\{\vec{s}_B\}\}\} = DEMOD_{EQ}\{\vec{s}_B\} = \vec{S}_l$$

Hence, the adaptive digital pre-distortion framework based on a modulation vector error, as disclosed in the present invention, has advantages as follows: calculating and processing a modulation vector error with a demodulation signal to adjust digital pre-distortion; dispensing with the need to perform complicated computation based on an intricate non-linear model as well as related matrices and vectors in order to extract received signal model parameters; and reducing overall complexity of processing digital pre-distortion, thereby facilitating the implementation of various communication systems. Therefore, the present invention is applicable to the transmitting ends of various wireless communication systems, such as mobile communication, cable communication, satellite communication, and digital TV communication, but the present invention is not limited thereto.

Figure 4:
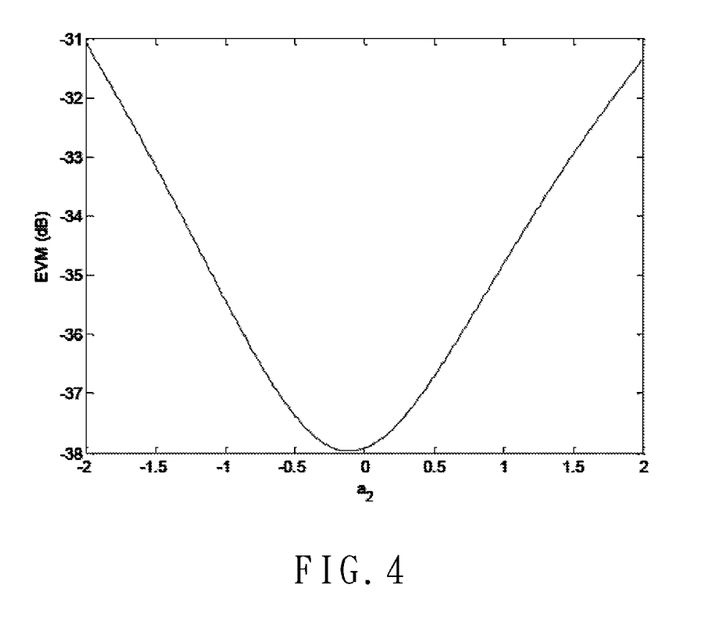
FIG. 4 is a graph of results of simulation of the adaptive digital pre-distortion system according to an embodiment of the present invention.

FIG. 4 is a graph of results of simulation of the adaptive digital pre-distortion system according to an embodiment of the present invention. In this embodiment, with reference to FIG. 3B, the order of a pre-distortion polynomial of the non-linear region is set to P=3, and only one parameter needs to be searched under the restrictive condition dpd $\vec{a}(1)=1$. In this embodiment, $a_2$ denotes a search parameter, with $\Delta a_2=0.01$. FIG. 4 is a diagram of curve characteristics of $a_2$ and EVM, which involves the use of a specific OFDM signal in searching for the relation between $a_2$ and EVM(dB) when OBO (output back-off)=7 dB, wherein EVM is defined as $$E\left\{\left|\vec{R} - \vec{S}\right|^2\right\} / E\left\{\left|\vec{S}\right|^2\right\}.$$

Figure 5A:
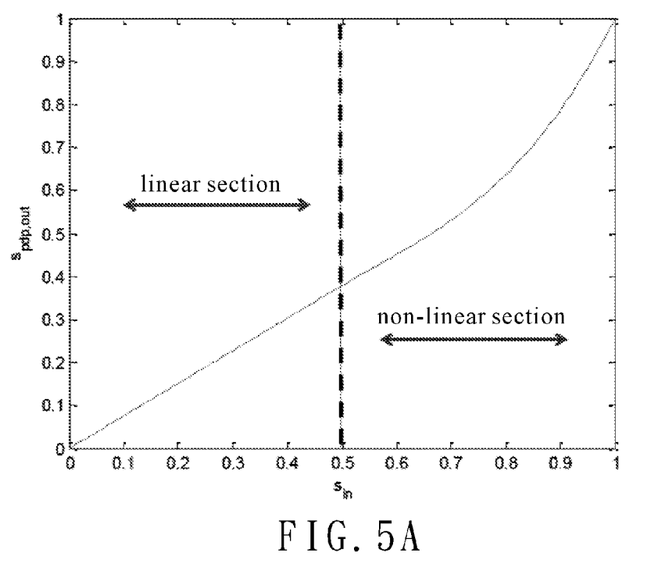
FIG. 5A~FIG. 5B are graphs of results of simulation of the adaptive digital pre-distortion system according to an embodiment of the present invention.
Figure 5B:
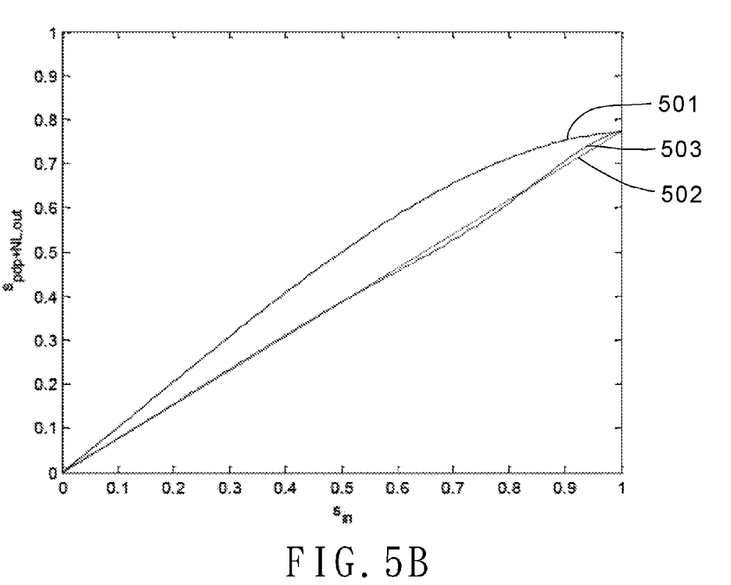

FIG. 5A~FIG. 5B are graphs of results of simulation of the adaptive digital pre-distortion system according to an embodiment of the present invention. FIG. 5A and FIG. 5B show a two-section polynomial digital pre-distortion function based on the best parameter and the results of related linearization. Curve 501 depicts the result of ideal PA, which requires precise calculation or simulation software. Curve 502 depicts the results of the DPD of the present invention. Curve 503 depicts the results of the original DPD. FIG. 5A and FIG. 5B show that the results of curve 502 approximate to the results of the original DPD depicted by curve 503, that is, both achieving the goal of correction.

Figure 6A:
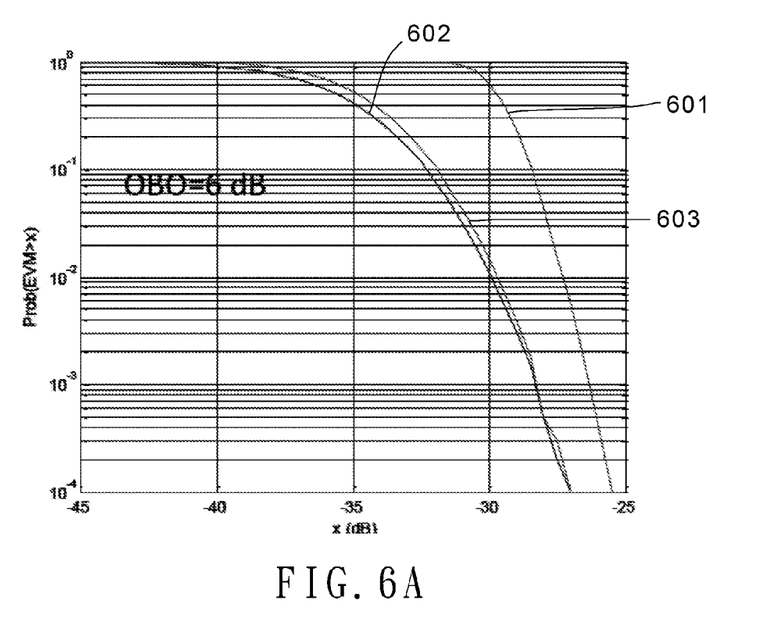
FIG. 6A~FIG. 6B are graphs of results of simulation of the adaptive digital pre-distortion system according to an embodiment of the present invention.
Figure 6B:
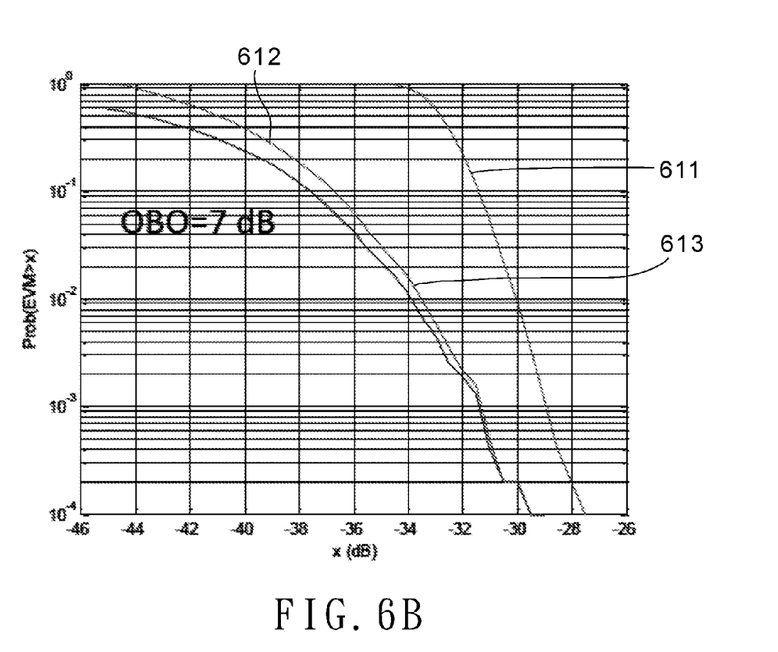

FIG. 6A~FIG. 6B are graphs of results of simulation of the adaptive digital pre-distortion system according to an embodiment of the present invention. Referring to FIG. 6A and FIG. 6B, they are diagrams of the EVM probability distribution of 10000 OFDM code signals generated at random under an online adaptive digital pre-distortion mechanism. Curve 601 depicts the results of the original PA. Curve 602 and curve 603 depict the results of the ideal DPD and the DPD of the present invention, respectively.

FIG. 5A, FIG. 5B, FIG. 6A and FIG. 6B show that adaptive pre-distortion effectuated in accordance with the present invention approximates to ideal pre-distortion. However, ideal pre-distortion corrects only the characteristics in the non-linear region, and thus the saturated region still limits the quality of transmission of the OFDM signals, because the OFDM signals display high PAPR characteristics. Compared with the prior art, the above embodiments of the present invention integrate modulation vector error measurement and simple two-section polynomial response and propose its related adaptive pre-distortion algorithm mechanism. Unlike the prior art which requires a complicated non-linear model and related computation based on matrices and vectors, the present invention entails performing demodulation signal processing, for example, with OFDM signals, to demodulate the required signals by, for example, an FFT algorithm, and thus its complexity is directly proportional to $N \cdot \log_2 N$ (N denotes the normal length of OFDM code), not to mention that the present invention is easy to implement by software or hardware.

Accordingly, the present invention provides an adaptive digital pre-distortion system which requires simple computation resources and enhances the efficiency of adaptive pre-distortion operation. The pre-distortion operation is adjusted with reference to the modulation vector error rather than conventional signal waveform distortion and thereby greatly reduces the complexity of the required computation resources, thereby simplifying the required hardware or software. In an embodiment of the present invention, pre-distortion operation is constructed with a two-section polynomial response model to further simplify the computation resources required for the pre-distortion. Therefore, the adaptive digital pre-distortion system of the present invention facilitates the implementation of a communication system and enhances overall communication efficiency.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. An adaptive digital pre-distortion system, comprising:
a transmitting module configured to receive and transmit a first signal being a transmitted QAM symbol, comprising:
a modulator for modulating the first signal and generating a first modulation signal;
a pre-distortion module coupled to the modulator to perform a pre-distortion operation in accordance with the first modulation signal and generate a first pre-distortion signal; and
a transmitting circuit comprising a digital-to-analog converter, a radio frequency up-converter and a radio frequency amplifier, coupled to the pre-distortion module to generate a first transmitted signal in accordance with the first pre-distortion signal, the first transmitted signal being transmitted through at least an antenna unit; and
a receiving module configured to receive the first transmitted signal, comprising:
a receiving circuit comprising a low-noise amplifier, a radio frequency down-converter and an analog-to-digital converter, for receiving the first transmitted signal before generating a first received signal;
a demodulator coupled to the receiving circuit to demodulate the first received signal and generate a first demodulation signal being a received QAM symbol; and
a prediction module coupled to the demodulator and the pre-distortion module to generate a pre-distortion parameter in accordance with an error vector measurement of a modulation vector error between the first demodulation signal and the first signal and transmit the pre-distortion parameter to the pre-distortion module, so as to minimize the error vector measurement, wherein the pre-distortion module adjusts the pre-distortion operation of the pre-distortion module in accordance with the pre-distortion parameter, wherein the pre-distortion operation has a two-section polynomial model of AM-AM non-linearity.

2. The adaptive digital pre-distortion system of claim 1, wherein:
the prediction module updates the pre-distortion parameter in accordance with a variation in the modulation vector error between the first demodulation signal and the first signal as time goes by and updates the pre-distortion parameter in accordance with a first mode in case of a reduction in the modulation vector error, and
the prediction module updates the pre-distortion parameter in accordance with a second mode if the modulation vector error varies rather than reduces.

3. The adaptive digital pre-distortion system of claim 2, wherein the pre-distortion module adjusts coefficients of a polynomial in a pre-distortion response of the pre-distortion module in accordance with the pre-distortion parameter.

4. The adaptive digital pre-distortion system of claim 1, wherein:
the pre-distortion module generates, in a first section of the pre-distortion operation, the first pre-distortion signal in linear relation to the first modulation signal in accordance with the first modulation signal;
the pre-distortion module generates, in a second section of the pre-distortion operation, the first pre-distortion signal in non-linear relation to the first modulation signal in accordance with the first modulation signal.

5. The adaptive digital pre-distortion system of claim 4, wherein the non-linear relation is a polynomial relation.

* * * * *